US007542522B2

(12) United States Patent
Ross et al.

(10) Patent No.: US 7,542,522 B2
(45) Date of Patent: *Jun. 2, 2009

(54) DEVICE, SYSTEM AND METHOD OF WIRELESS SIGNAL DETECTION

(75) Inventors: Rony Ross, Haifa (IL); Simha Sorin, Haifa (IL); Yuval Finkelstein, Yokneam Elite (IL)

(73) Assignee: Intel Corporation, Santa Clara, CA (US)

( * ) Notice: Subject to any disclaimer, the term of this patent is extended or adjusted under 35 U.S.C. 154(b) by 627 days.

This patent is subject to a terminal disclaimer.

(21) Appl. No.: 11/229,543

(22) Filed: Sep. 20, 2005

(65) Prior Publication Data

US 2007/0064842 A1    Mar. 22, 2007

(51) Int. Cl.
H03K 9/00        (2006.01)
(52) U.S. Cl. ...................................... 375/316; 455/270
(58) Field of Classification Search ................ 375/316; 455/270

See application file for complete search history.

(56) References Cited

U.S. PATENT DOCUMENTS

| 5,373,159 | A * | 12/1994 | Goldenberg et al. ... 250/339.15 |
| 6,771,976 | B1 * | 8/2004 | Koyama ..................... 455/502 |
| 2002/0065047 | A1 | 5/2002 | Moose |
| 2003/0054755 | A1 | 3/2003 | Zehavi et al. |
| 2003/0067999 | A1 * | 4/2003 | Echavarri et al. ............. 375/343 |
| 2004/0127204 | A1 * | 7/2004 | Belmont ..................... 455/418 |
| 2004/0170237 | A1 * | 9/2004 | Chadha et al. ............... 375/343 |
| 2004/0190438 | A1 | 9/2004 | Maltsev et al. |
| 2005/0015589 | A1 * | 1/2005 | Silverman et al. ........... 713/160 |
| 2005/0135432 | A1 * | 6/2005 | Kelley et al. ................ 370/532 |
| 2005/0220212 | A1 * | 10/2005 | Marsili ....................... 375/275 |
| 2006/0031740 | A1 * | 2/2006 | Kidambi et al. ............. 714/776 |
| 2006/0050800 | A1 * | 3/2006 | Aytur et al. ................ 375/260 |
| 2007/0195914 | A1 * | 8/2007 | Chang et al. ................ 375/343 |

OTHER PUBLICATIONS

Canet, "FPGA implementation of an IF transceiver for OFDM-based WLAN", IEEE Workshop in Signal Processing Systems, 2004, SIPS 2004, 2004 pp. 227-232.*
Canet M J et al.; "A Common FPGA Based Synchronizer Architecture for Hiperlan/2 and IEEE 802.11A Wlan System" Personal, Indoor and Mobile Radio Communication, 2004, 15TH IEEE International Symposium on Barcelona, Spain Sep. 5-8, 2004, Piscataway, NJ, USA, IEEE, vol. 1, Sep. 5, 2004 pp. 531-535.
International Search Report Mailed Feb. 12, 2007 Application No. PCT/US2006/030518.

* cited by examiner

Primary Examiner—Juan A Torres
(74) Attorney, Agent, or Firm—Leason Ellis LLP

(57) ABSTRACT

Some embodiments of the invention provide devices, systems and methods of wireless signal detection. For example, an apparatus in accordance with an embodiment of the invention includes a detector to determine whether an incoming input includes a wireless communication signal intended for reception, based on an operation applied to a first auto-correlation value and a second auto-correlation value, wherein the first auto-correlation value represents a correlation between values of the incoming input at times separated by a first delay period, and wherein the second auto-correlation value represents correlation between values of the incoming input at times separated by a second, different, delay period; the first delay period is not an integer multiple of the second delay period, and the second delay period is not an integer multiple of the first delay period.

9 Claims, 2 Drawing Sheets

DEVICE, SYSTEM AND METHOD OF WIRELESS SIGNAL DETECTION

BACKGROUND OF THE INVENTION

In the field of wireless communications, a first wireless communication station may include a receiver to detect and receive a wireless communication signal transmitted, for example, by a second wireless communication station or a wireless access point. The wireless communication signal may be, for example, in accordance with a wireless communication standard or protocol, e.g., Institute of Electrical and Electronics Engineers (IEEE) standard 802.11.

Various devices may transmit or otherwise emit wireless communication signals, which may interfere with the wireless signal intended for reception by the first wireless communication station. Such interfering devices may include, for example, a microwave oven, a radar, or a wireless communication device operating in accordance with a standard or protocol different from the standard or protocol used by the first wireless communication station, e.g., Bluetooth.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
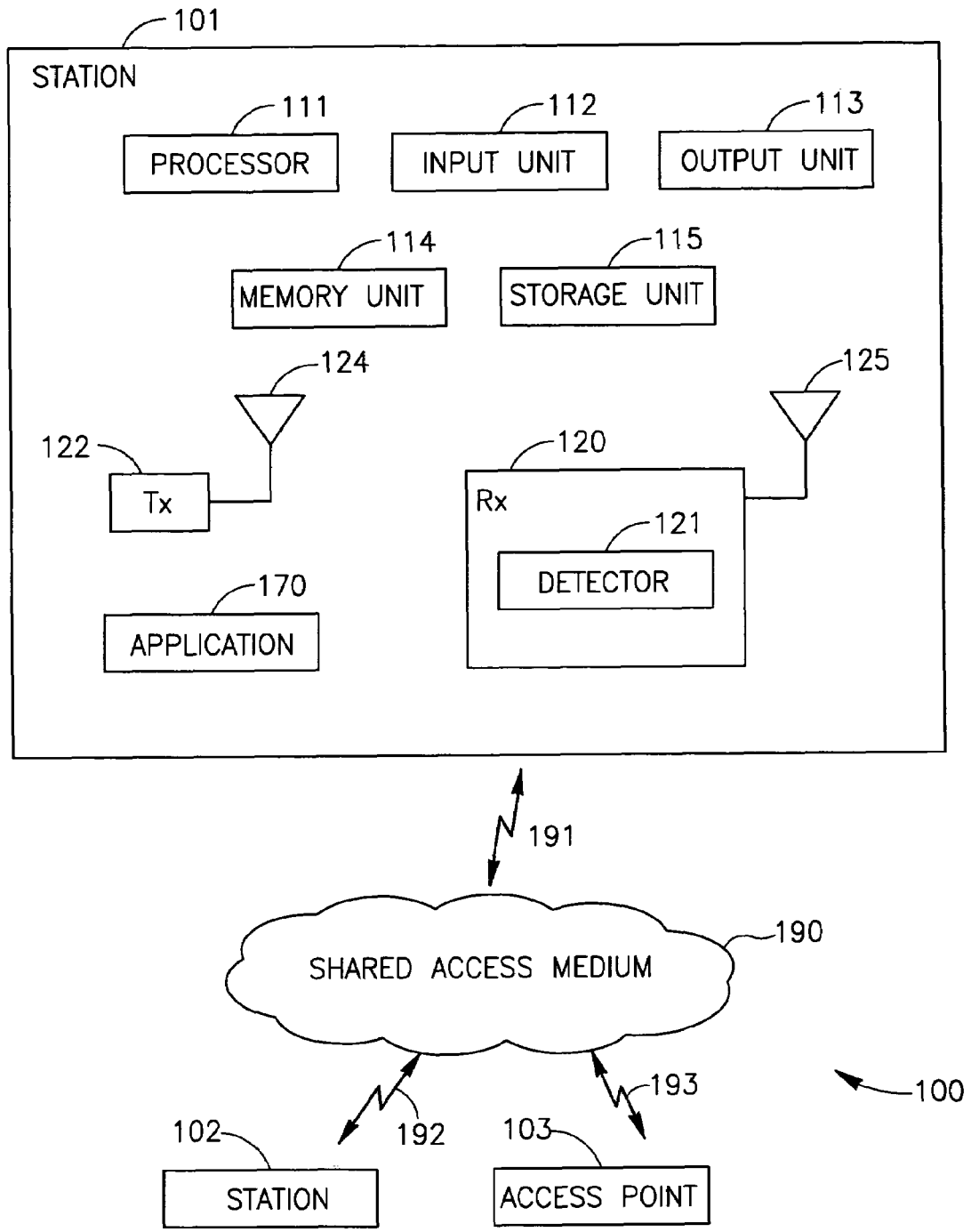
FIG. 1 is a schematic block diagram illustration of a wireless communication system including a wireless communication station able to detect wireless communication signals in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11h, 802.11i, 802.11n, 802.16 standards a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Embodiments of the invention may be used in various other apparatuses, devices, systems and/or networks.

The terms "detect" and "detection" as used herein may include, for example, performing one or more detection operations, e.g., to determine whether an incoming input is or includes a wireless communication signal intended for reception. In some embodiments, signal detection may result in, for example, a binary result, e.g., "1" or "0", "True" or "False", "Signal Detected" or "No Signal Detected", or the like, corresponding to detection or non-detection of a wireless signal intended for reception. In other embodiments, signal detection may result in, for example, a non-binary result or value, e.g., which may be compared to a pre-defined threshold value differentiating between noise or interference from a wireless signal intended for reception. The terms "detect" and "detection" as used herein may include other suitable operations, analysis or calculations for determining whether an incoming input is or includes a wireless communication signal intended for reception, for identifying a wireless communication signal intended for reception, for differentiating between noise or interference and a wireless communication signal intended for reception, or the like.

FIG. 1 schematically illustrates a block diagram of a wireless communication system 100 including a wireless communication station able to reject wireless interference in accordance with an embodiment of the invention. System 100 may include one or more wireless communication stations, e.g., stations 101 and 102, and one or more wireless access points, e.g., access point 103. Station 101, station 102 and access point 103 may communicate using a shared access medium 190, for example, through wireless communication links 191, 192 and 193, respectively.

Station 101 may include, for example, a processor 111, an input unit 112, an output unit 113, a memory unit 114, a storage unit 115, a receiver 120, a transmitter 122, and one or more antennas, e.g., antennas 124 and 125. Station 101 may further include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Input unit 112 may include, for example, a keyboard, a keypad, a mouse, a touch-pad, a microphone, or other suitable pointing device or input device. Output unit 113 may include, for example, a Cathode Ray Tube (CRT) monitor or display unit, a Liquid Crystal Display (LCD) monitor or display unit, a speaker, or other suitable monitor or display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units.

Transmitter 122 may include, for example, a wireless Radio Frequency (RF) transmitter able to transmit RF signals, e.g., through antenna 124. Receiver 120 may include, for example, a one or more wireless RF receivers able to receive RF signals, e.g., through antenna 125. In some embodiments, receiver 120 may include multiple receivers able to receiver RF signals in accordance with multiple wireless communication standard or protocol, for example, a first receiver able to operate in accordance with IEEE 802.11a standard, a second receiver able to operate in accordance with IEEE 802.11b standard, or the like.

In some embodiments, the functionality of transmitter 122 and receiver 120 may be implemented in the form of a transceiver, a transmitter-receiver, or one or more units able to perform separate or integrated functions of transmitting and/or receiving wireless communication signals, blocks, frames, transmission streams, packets, messages and/or data.

Antenna 124 and/or antenna 125 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, optionally, an application 170 may be executed by one or more components of station 101, for example, by processor 111. The application 170 may include; for example, a software application, an Operating System (OS), a communications driver, or the like, and may be stored in memory unit 114 and/or storage unit 115.

In some embodiments, receiver 120 may include a detector 121 to detect incoming wireless communication signals. Detector 121 may be implemented as, for example, a sub-unit of station receiver 120, a sub-unit of processor 111, a detection controller, a detection circuit, or other hardware component and/or software component.

In accordance with some embodiments, detector 121 may determine that an incoming input is or includes a wireless communication signal intended for reception, and the incoming input may be acquired and received by receiver 120. Conversely, detector 121 may determine that the incoming input is noise, a repetitive interference signal, an interference signal, or a wireless communication signal not intended for reception, and the incoming input may not be acquired and may not be received by receiver 120.

For example, detector 121 may determine whether an incoming input is or includes a wireless communication signal intended for reception, based on an operation, a function or a calculation applied to a first auto-correlation value and a second auto-correlation value. The first auto-correlation value may represent a correlation between two portions of the incoming input delayed by a first delay period, or a correlation between values of the incoming input at times separated by the first delay period. The second auto-correlation value may represent correlation between two portions of the incoming input delayed by a second, different delay period, or a correlation between values of the incoming input at times separated by the second delay period.

Figure 2:
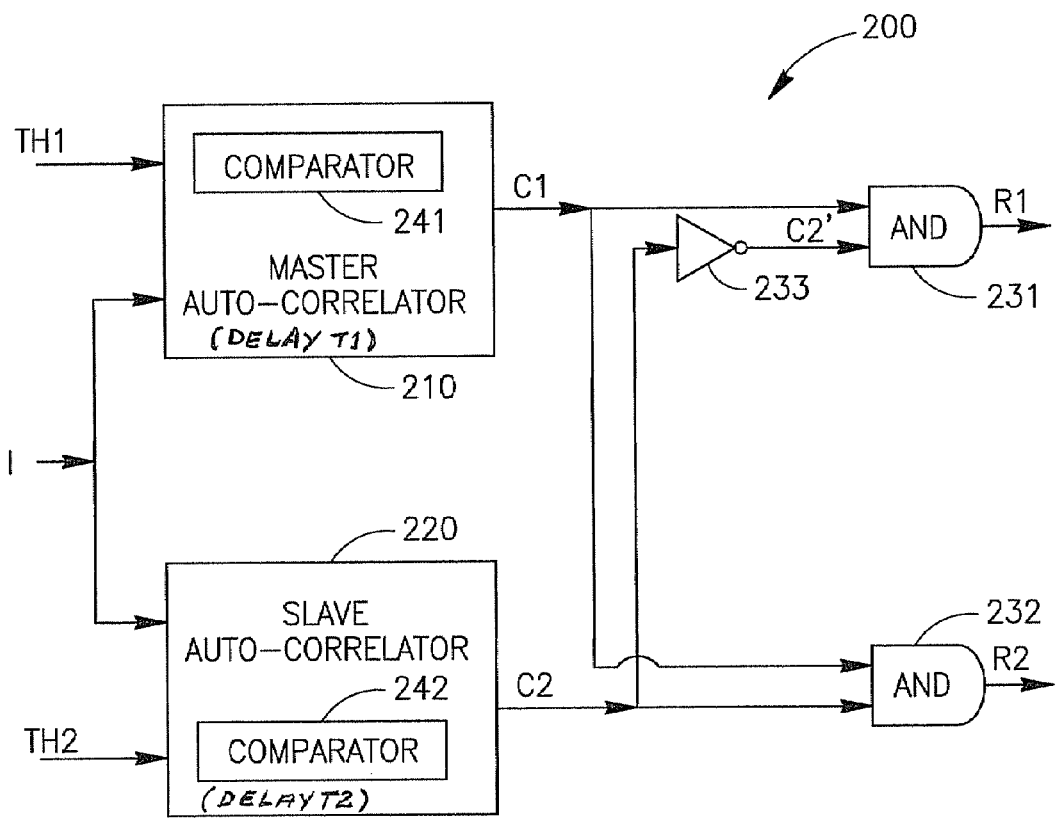
FIG. 2 is a schematic block diagram illustration of a detector able to detect a wireless communication signal in accordance with some embodiments of the invention.

FIG. 2 schematically illustrates a block diagram of a detector 200 able to detect a wireless signal in accordance with an embodiment of the invention. Detector 200 may be an example of detector 121 of FIG. 1.

Detector 200 may include multiple correlators, for example, a master auto-correlator 210 and a slave auto-correlator 220, whose output may be connected parallel, as shown in FIG. 2, to circuitry having one or more logical gates, e.g., inverter 233, AND gate 231 and AND gate 232. An incoming input I may enter, e.g., in parallel, the master auto-correlator 210 and the slave auto-correlator 220.

Master auto-correlator 210 may perform auto-correlation of the incoming input I. Master auto-correlator 210 may, for example, auto-correlate between a first portion of the incoming input I, and a second, delayed portion of the incoming input I. The second portion may be delayed relative to the first portion by a first delay period, denoted T1. For example, master auto-correlator 210 may auto-correlate between a portion of the incoming input I, and a T1-delayed portion of the incoming input I. The first and second portions may have the same length, or the same amount of discrete samples. In some embodiments, master auto-correlator 210 may auto-correlate between values of the incoming input I at times separated by the first delay period T1. The auto-correlation may be performed in relation to a first threshold value, denoted TH1. The first threshold value TH1 may be, for example, adaptive, and may indicate a minimum auto-correlation value for which detection of a signal intended for reception may be determined. The output of master auto-correlator 210, denoted C1, may be, for example, a value of "1" indicating that a signal is detected, or a value of "0" indicating that no signal is detected.

Slave auto-correlator 220 may perform auto-correlation of the incoming input I. Slave auto-correlator 220 may, for example, auto-correlate between a first portion of the incoming input I, and a second, delayed portion of the incoming input I. The second portion may be delayed relative to the first portion by a second delay period, denoted T2. For example, slave auto-correlator 220 may auto-correlate between a portion of the incoming input I, and a T2-delayed portion of the incoming input I. The first and second portions may have the same length, or the same amount of discrete samples. In some embodiments, slave auto-correlator 220 may auto-correlate between values of the incoming input I at times separated by the second delay period T2. The auto-correlation may be performed in relation to a second threshold Value, denoted TH2. The second threshold value TH2 may be, for example, adaptive, and may indicate a minimum auto-correlation value for which detection of a signal intended for reception may be determined. The output of slave auto-correlator 220, denoted C2, may be, for example, a value of "1" indicating that a signal is detected, or a value of "0" indicating that no signal is detected.

In some embodiments, the first delay period T1 may be different from the second delay period T2; the first delay period T1 may not be divisible by the second delay period T2; and the second delay period T2 may not be divisible by the first delay period T1. In other words, T1 may not be an integer multiple of T2, and T2 may not be an integer multiple of T1; i.e., T1/T2 may not be an integer, and T2/T1 may not be an integer. In some embodiments, T1 and T2 may not have a common divisor, e.g., may not be divisible by the same divisor.

In some embodiments, T1 may be an integer multiple of a periodicity period in accordance with a wireless communication standard, and T2 may be a non-integer multiple of that periodicity period. In some embodiments, T1 may be an integer multiple of a periodicity period in accordance with a first wireless communication standard, and T2 may be an integer multiple of a periodicity period in accordance with a second, different, wireless communication standard.

In some embodiments, optionally, one or more of the values or portions of incoming input I, on which master auto-correlator 210 may perform auto-correlation, may be used for auto-correlation by slave auto-correlator 220. For example, in one embodiment, master auto-correlator 210 may auto-correlate between a first portion of the incoming input I and a second portion of the incoming input I delayed by delay period T1 relative to the first portion; whereas slave auto-correlator 220 may auto-correlate between the first portion of the incoming input I and a third portion of the incoming input I delayed by delay period T2 relative to the first portion. In another embodiment, master auto-correlator 210 may auto-correlate between a first portion of the incoming input I and a second portion of the incoming input I delayed by delay period T1 relative to the first portion; whereas slave auto-correlator 220 may auto-correlate between a third portion of the incoming input I and a fourth portion of the incoming input I delayed by delay period T2 relative to the third portion.

The output C1 of master auto-correlator 210, and the output C2 of slave auto-correlator 220, may enter a logical gate, for example, AND gate 232. For example, if both C1 and C2 are equal to "1", then the output of AND gate 232, denoted R2, may be equal to "1". An R2 value of "1" may indicate, for example, that the incoming input I is noise, a repetitive interference signal, an interference signal, or a wireless communication signal not intended for reception; accordingly, the incoming input I may not be acquired and may not be received by a receiver operatively associated with detector 200.

Additionally or alternatively, the output C2 of slave auto-correlator 220 may be inverted using inverter 233, to result in an inverted value, denoted C2'. The inverted value C2' and the output C1 of master auto-correlator 210 may enter a logical gate, for example, AND gate 231. For example, if both C1 and C2' are equal to "1", then the output of AND gate 231, denoted R1, may be equal to "1". An R1 value of "1" may indicate, for example, that the incoming input I is or includes a wireless communication signal intended for reception, e.g., a valid wireless communication signal and not noise, a repetitive interference signal, an interference signal, or a wireless communication signal not intended for reception; accordingly, the incoming input I may be acquired and may be received by a receiver operatively associated with detector 200.

In some embodiments, for example, an interfering device may transmit or emit a wireless single-carrier narrow-band signal, which may be periodic with respect to substantially any delay period. Therefore, a determination that a portion of the incoming input I auto-correlates with both a T1-delayed portion and with a T2-delayed portion may indicate that the incoming input I is transmitted or emitted from an interfering device, or represents noise, a repetitive interference signal, an interference signal, or a wireless communication signal not intended for reception.

Conversely, a wireless communication signal intended for reception, for example, a valid signal in accordance with 802.11 standards, may have a specific periodicity, such that the signal may be periodic with respect to a certain, pre-defined delay period. Therefore, a determination that a portion of the incoming input I auto-correlates with a T1-delayed portion but does not correlate with a T2-delayed portion, or vice versa, may indicate that the incoming input I is or includes a valid wireless communication signal intended for reception.

In some embodiments, if both R1 and R2 are equal to "0", then it may be determined that no wireless communication signal is detected.

Optionally, in some embodiments, delay period T1 and/or delay period T2 may be equal to a periodicity interval in accordance with one or more wireless communication standards or protocols. For example, in some embodiments, delay period T1 may be equal to 0.8 milliseconds, corresponding to a periodicity interval in accordance with 802.11a standard; additionally or alternatively, delay period T2 may be equal to one millisecond, corresponding to a periodicity interval in accordance with 802.11b standard. In one embodiment, for example, master auto-correlator 210 may be operatively associated with a receiver able to receive wireless signals in accordance with a first wireless communication standard or protocol, e.g., 802.11a standard; additionally or alternatively, slave auto-correlator 220 may be operatively associated with a receiver able to receive wireless signals in accordance with a second wireless communication standard or protocol, e.g., 802.11b standard. For example, auto-correlator 210 may operate as a master auto-correlator for detection of 802.11a signals, and auto-correlator 220 may operate as a slave auto-correlator for detection or rejection of interference or non-802.11a signals; whereas auto-correlator 220 may operate as a master auto-correlator for detection of 802.11b signals, and auto-correlator 210 may operate as a slave auto-correlator for detection or rejection of interference or non-802.11b signals.

In some embodiments, threshold value TH1 may be different from threshold value TH2, and threshold values TH1 and TH2 may be pre-defined in specific implementations, e.g., to achieve a certain detection sensitivity and/or to avoid or reduce incorrect positive detection results ("false alarms") above a certain rate. Threshold value TH1 and/or threshold value TH2 may optionally be an adaptive threshold value, for example, produced by passing the incoming input I through a power meter and multiplying the output of the power meter by a constant, e.g., using a scaler.

In some embodiments, detector 200 may include other suitable components. For example, in one embodiment, optionally, master auto-correlator 210 may generate an auto-correlation value, and may include a comparator 241 to compare the auto-correlation value to threshold TH1 and to produce the auto-correlation result C1; similarly, slave auto-correlator 220 may generate an auto-correlation value, and may include a comparator 242 to compare the auto-correlation value to threshold TH2 and to produce the auto-correlation result C2.

Although certain logical gates are shown in FIG. 2, e.g., inverter 233 and AND gates 231 and 232, embodiments of the invention are not limited in this regard, and may include, for example, other suitable gates, circuitry, or logical operations; other suitable functions, calculations or logical operations may be used.

Although FIG. 2 shows detector 200 including two auto-correlators 210 and 220, other suitable combinations of components may be used, and other number of correlators or auto-correlators may be used. For example, in some embodiments, a detector or detection circuit may be operatively associated with multiple auto-correlator units utilizing various delay periods, which may be separate units from the detector, may not be included in the detector, or may provide auto-correlation values or auto-correlation results to the detector.

Although portions of the discussion herein may relate, for demonstrative purposes, to auto-correlation between values or portions of the incoming input at times separated by a delay period, embodiments of the invention are not limited in this regard. For example, in some embodiments, real-time or non real-time measurements or units may be used to indicate a beginning and/or an ending of a portion of the incoming input used for auto-correlation; or other indications may be used to identify values or portions for auto-correlation, for example, number of bits, bytes, samples, discrete samples, symbols, frames, data items, counting units, or the like.

Figure 3:
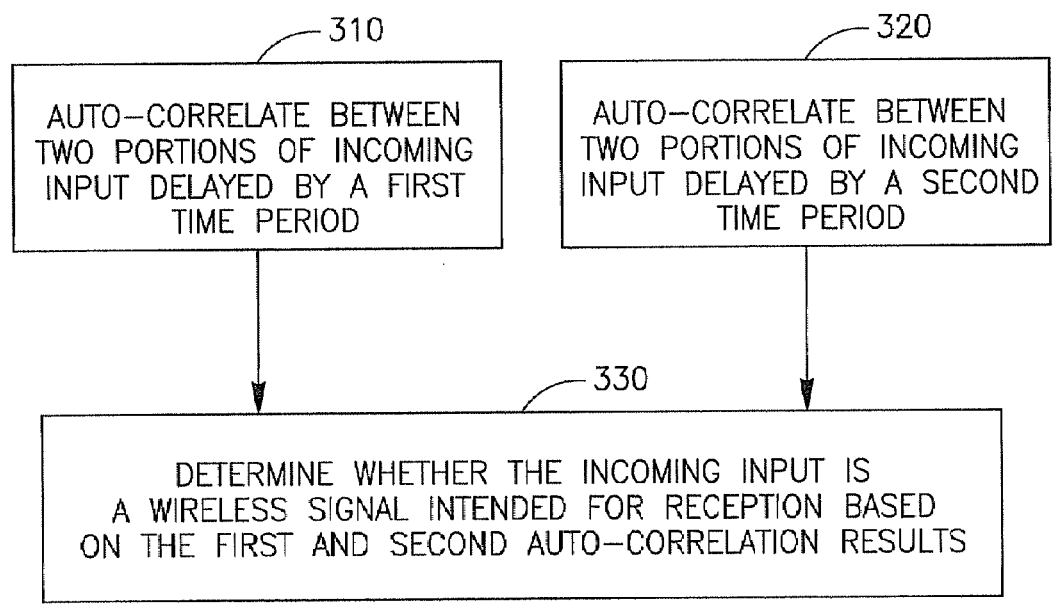
FIG. 3 is a schematic flow-chart of a method of wireless signal detection in accordance with an embodiment of the invention.

FIG. 3 is a schematic flow-chart of a method of wireless signal detection in accordance with an embodiment of the invention. Operations of the method may be implemented, for example, by system 100 of FIG. 1, by station 101 of FIG. 1, by processor 111 of FIG. 1, by detector 121 of FIG. 1, by detector 200 of FIG. 2, and/or by other suitable stations, access points, detectors, receivers, controllers, processors, units, devices, and/or systems.

As indicated at box 310, the method may optionally include, for example, performing auto-correlation based on a portion of an incoming input and a T1-delayed portion of the incoming input. In some embodiments, the auto-correlation may be performed in relation to a first threshold value, and may optionally include comparing an auto-correlation value to the first threshold value. In some embodiments, for example, a first auto-correlation value or result may be generated.

As indicated at box 320, the method may optionally include, for example, performing auto-correlation based on a portion of the incoming input and a T2-delayed portion of the incoming input. In some embodiments, the auto-correlation may be performed in relation to a second threshold value, and may optionally include comparing an auto-correlation value to the second threshold value. In some embodiments, for example, a second auto-correlation value or result may be generated.

In accordance with some embodiments of the invention, the first delay period T1 may be different from the second delay period T2; the first delay period T1 may not divide the second delay period T2; and the second delay period T2 may not divide the first delay period T1. For example, in one embodiment, T1 may be equal to kT2, wherein k may be a non-natural number.

In one embodiment, for example, the operations of boxes 310 and 320 may be performed substantially in parallel or substantially simultaneously.

As indicated at box 330, the method may optionally include, for example, determining whether the incoming input is or includes a valid wireless communication signal intended for reception, or, conversely, represents noise, a repetitive interference signal, an interference signal, or a wireless communication signal not intended for reception. This may be performed, for example, based on the first and second auto-correlation results or values. For example, in one embodiment, if both the first and second auto-correlation results are equal to "1", then it may be determined that the incoming input represents noise, a repetitive interference signal, an interference signal, or a wireless communication signal not intended for reception. If one, but not both, of the first and second auto-correlation results is equal to "1", then it may be determined that the incoming input represents or includes a valid wireless communication signal intended for reception. If none of the first and second auto-correlation results is equal to "1", then it may be determined that no wireless communication signal is detected, or that a wireless signal intended for reception is not detected.

Other suitable operations or sets of operations may be used in accordance with embodiments of the invention.

Although portions of the discussion herein may relate, for exemplary purposes, to a value of "1" indicating a positive correlation result or a positive detection result, and to a value of "0" indicating a negative correlation result or a negative detection result, embodiments of the invention are not limited in this regard. For example, in some embodiments, a value of "1" may indicate a negative correlation result or a negative detection result, and a value of "0" may indicate a positive correlation result or a positive detection result. In some embodiments, other suitable values or indication may be used, for example, "True"/"False", or the like. In some embodiments, the output of auto-correlators 210 and/or 220 may be normalized, non-normalized, adaptive, divided by a pre-defined maximum value, divided by an energy level or a maximum energy level, or otherwise processed.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, by detector 121 of FIG. 1, by detector 200 of FIG. 2, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A detector comprising:
   a master auto-correlator having an output auto-correlation value representing correlation between values of an input signal at times separated by a first delay period, $T_1$;
   a slave auto-correlator having an output auto-correlation value representing correlation between values of the input signal at times separated by a second delay period, $T_2$, different from the first delay period;
   a first logic circuit; and
   a second logic circuit;
   the output auto-correlation values of the master and slave auto-correlators are applied to the first and second logic circuits respectively whereby the outputs of the logic circuits indicate whether the input signal is a communication signal intended for reception.

2. The detector of claim 1 wherein the master and slave auto-correlators each has a comparator with a first threshold, TH1, applied to the comparator of the master auto-correlator and a second threshold, TH2, applied to the comparator of the slave auto-correlator where the output auto-correlation value of the master auto-correlator is a result of a comparison by its comparator between its auto-correlation value and the first threshold and the output auto-correlation value of the slave auto-correlator is a result of a comparison by its comparator between its auto-correlation value and the second threshold.

3. The detector of claim 1 wherein the first logic circuit is a logical AND gate with a first input connected to the output of the master auto-correlator and a second input connected to an output of logical NOT gate whose input is connected to the output of the slave auto-correlator and where the second logic circuit is a logical AND gate with a first input connected to the output of the master auto-correlator and a second input connected to the output of the slave auto-correlator.

4. The detector of claim 1 where the first delay period corresponds to a periodicity interval of a first wireless communication standard and the second delay period corresponds to a periodicity interval of a second communication standard.

5. The detector of claim 2 where the first delay period is not an integer multiple of the second delay period and the second delay period is not an integer multiple of the first delay period.

6. A method of detecting a communication signal intended for reception, the method comprising:
   performing a first auto-correlation of an input signal at times separated by a first delay period, $T_1$, using a first auto-correlator, resulting in a first auto-correlation value; and
   performing a second auto-correlation of the input signal at times separated by a second delay period, $T_2$, different form the first delay period, using a second auto-correlator, resulting in a second auto-correlation value; and
   determining whether the input signal is intended for reception based on applying the first and second auto-correlation values to logical circuits.

7. The method of claim 6 wherein the step of determining whether the input signal is intended for reception comprises applying the resulting auto-correlation values to one or more logical AND circuits whose outputs indicate whether the input signal is intended for reception.

8. The method of claim 6 wherein the step of performing a first auto-correlation comprises comparing an auto-correlation result of the first auto-correlation to a first threshold value to yield the first auto-correlation value and comparing an auto-correlation result of the second auto-correlation to a second threshold value to yield the second auto-correlation value.

9. The method of claim 6 wherein the first delay period is not an integer multiple of the second delay period and the second delay period is not an integer multiple of the first delay period.

* * * * *

UNITED STATES PATENT AND TRADEMARK OFFICE
CERTIFICATE OF CORRECTION

PATENT NO. : 7,542,522 B2 Page 1 of 1
APPLICATION NO. : 11/229543
DATED : June 2, 2009
INVENTOR(S) : Rony Ross et al.

It is certified that error appears in the above-identified patent and that said Letters Patent is hereby corrected as shown below:

In column 10, line 3, in Claim 5, delete "claim 2" and insert -- claim 1 --, therefor.

In column 10, line 11, in Claim 6, after "value;" delete "and".

In column 10, line 14, in Claim 6, delete "form" and insert -- from --, therefor.

Signed and Sealed this

First Day of September, 2009

David J. Kappos
*Director of the United States Patent and Trademark Office*